United States Patent
Tadanaga et al.

(10) Patent No.: US 11,768,421 B2
(45) Date of Patent: Sep. 26, 2023

(54) WAVELENGTH CONVERSION DEVICE

(71) Applicant: Nippon Telegraph and Telephone Corporation, Tokyo (JP)

(72) Inventors: Osamu Tadanaga, Musashino (JP); Takeshi Umeki, Musashino (JP); Koji Embutsu, Musashino (JP); Nobutatsu Koshobu, Musashino (JP); Takahiro Kashiwazaki, Musashino (JP); Asuka Inoue, Musashino (JP); Takushi Kazama, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/917,730

(22) PCT Filed: Apr. 20, 2020

(86) PCT No.: PCT/JP2020/017055
§ 371 (c)(1),
(2) Date: Oct. 7, 2022

(87) PCT Pub. No.: WO2021/214830
PCT Pub. Date: Oct. 28, 2021

(65) Prior Publication Data
US 2023/0161223 A1 May 25, 2023

(51) Int. Cl.
*G02F 2/00* (2006.01)
*G02F 1/35* (2006.01)
(Continued)

(52) U.S. Cl.
CPC ............ *G02F 2/006* (2021.01); *G02F 1/3548* (2021.01); *G02F 1/3551* (2013.01); *G02F 1/377* (2013.01)

(58) Field of Classification Search
CPC ....................................................... G02F 2/006
See application file for complete search history.

(56) References Cited

U.S. PATENT DOCUMENTS 5,815,307 A * 9/1998 Arbore ................. H01S 3/0057
359/328
6,926,770 B2 * 8/2005 Peng ..................... G02F 1/3558
117/1
(Continued)

FOREIGN PATENT DOCUMENTS

JP 2006-171230 A 6/2006
JP 2007-108593 A 4/2007
(Continued)

OTHER PUBLICATIONS

Y. Nishida, et al., *Direct-Bonded QPM-LN Ridge Waveguide with High Damage Resistance at Room Temperature*, Electronics Letters, vol. 39, No. 7, 2003, pp. 609-611.
(Continued)

*Primary Examiner* — Rhonda S Peace
(74) *Attorney, Agent, or Firm* — Workman Nydegger (57) ABSTRACT

A wavelength conversion device includes a second-order nonlinear optical medium with a polarization inversion structure, wherein the wavelength conversion device performs wavelength conversion between three wavelengths according to a relationship of $1/\lambda_1 = 1/\lambda_2 + 1/\lambda_3$, a polarization inversion period $\Lambda$ of the polarization inversion structure is divided into 2a regions, and when the 2a regions divided from the polarization inversion period $\Lambda$ each has a width ratio of an inverted region and a non-inverted region of r to $1-r$ (where $0 \le r \le 1$), a ratio value r is set such that, when one period in phase of a sine function from 0 to $2\pi$ is divided into 2a regions, a value of the sine function in a center of each divided region is $(1-2r) \pm 0.1$.

4 Claims, 5 Drawing Sheets

(51) Int. Cl.
  *G02F 1/355* (2006.01)
  *G02F 1/377* (2006.01)

(56) References Cited

U.S. PATENT DOCUMENTS

| | | | |
|---|---|---|---|
| 7,511,878 B2* | 3/2009 | Okayama | G02F 1/3558 |
| | | | 359/328 |
| 8,320,418 B2* | 11/2012 | Kuksenkov | G02F 1/3532 |
| | | | 372/21 |
| 8,411,353 B2 | 4/2013 | Kashyap et al. | |
| 10,353,269 B2* | 7/2019 | Rodriguez | G02F 1/3551 |
| 2003/0084837 A1* | 5/2003 | Lee | G02F 1/3558 |
| | | | 117/948 |
| 2009/0154508 A1* | 6/2009 | Chou | G02F 1/3534 |
| | | | 372/22 |
| 2023/0161223 A1* | 5/2023 | Tadanaga | G02F 1/3548 |
| | | | 359/326 |

FOREIGN PATENT DOCUMENTS

| | | |
|---|---|---|
| JP | 2013-526726 A | 6/2013 |
| WO | 2011/146310 A1 | 11/2011 |

OTHER PUBLICATIONS

T. Umeki, et al., *Highly Efficient Wavelength Converter Using Direct-Bonded PPZnLN Ridge Waveguide*, IEEE Journal of Quantum Electronics, vol. 46, No. 8, 2010, pp. 1206-1213.

* cited by examiner

WAVELENGTH CONVERSION DEVICE

TECHNICAL FIELD

The present invention relates to a wavelength conversion device, and more particularly to an optical element using a nonlinear optical effect, for example, a wavelength conversion device used in an optical communication system, an optical measurement system, or the like.

BACKGROUND ART

Wavelength conversion technology is applied to optical processing, medical treatment, biotechnology, and the like in addition to optical signal wavelength conversion in optical communication. A wavelength conversion device is used for a light source that outputs a wavelength range that cannot be directly output by a semiconductor laser in the ultraviolet to visible light range, the infrared light range, and the terahertz range and a light source that requires high output intensity that cannot be achieved by a semiconductor laser even in a wavelength range that can be directly output by a semiconductor laser. In particular, using lithium niobate (LiNbO$_3$: LN) or lithium tantalate (LiTaO$_3$:LT) which is a material exhibiting a second-order nonlinear optical effect and has a large nonlinear constant, wavelength conversion devices having a periodic polarization inversion optical structure in which the polarization direction of the material is inverted periodically along the propagation direction of light are used in various light sources due to their high efficiency and are already on the market.

The second-order nonlinear optical effect takes light of wavelengths $\lambda_2$ and $\lambda_3$ as an input and generates a shorter new wavelength $\lambda_1$ satisfying the following equation (1).

$$1/\lambda_1 = 1/\lambda_2 + 1/\lambda_3 \quad (1)$$

Wavelength conversion that satisfies equation (1) is called sum frequency generation (SFG).

In particular, equation (1) can be modified with $\lambda_3=\lambda_2$ such that light of $\lambda_2$ is input to generate light of $\lambda_1$ satisfying the following equation (2).

$$\lambda_1 = \lambda_2/2 \quad (2)$$

Wavelength conversion satisfying equation (2) is called second harmonic generation (SHG) because it generates light (of the second harmonic) having a wavelength that is half that of the input light.

Light having wavelengths $\lambda_1$ and $\lambda_2$ can also be taken as an input to generate a new longer wavelength $\lambda_3$ satisfying the following equation (3).

$$1/\lambda_3 = 1/\lambda_1 - 1/\lambda_2 \quad (3)$$

Wavelength conversion that satisfies equation (3) is called difference frequency generation (DFG) because light corresponding to the difference in the wavenumber (the spatial frequency or the reciprocal of the wavelength) is generated. For example, it is also possible in principle to generate infrared light of a long wavelength of $\lambda_3=3$ μm with $\lambda_1=1$ μm and $\lambda_2=1.5$ μm.

There is also an optical parametric effect that takes only $\lambda_1$ as an input and generates $\lambda_2$ and $\lambda_3$ satisfying equation (3).

Both equations (1) and (3) can be made the same just by transposing them and sum frequency generation (SFG) and difference frequency generation (DFG) differ only in the light input/output relationship and therefore the interaction of light of three wavelengths relating to wavelength conversion can be represented by equation (1).

SHG and SFG generate new short-wavelength light, that is, high-energy light in response to input light and convert long-wavelength input light into short-wavelength light and are often used to generate light in the visible light range or the like. On the contrary, DFG converts short-wavelength light into a long wavelength and is often used to generate light having a wavelength in the mid-infrared range or longer.

To efficiently cause such a second-order nonlinear optical effect, it is required that the amount of phase mismatch of three interacting wavelengths be 0 (phase matching be achieved). Thus, there is a method of setting the amount of phase mismatch to 0 through an angle matching method that appropriately sets the incident angle of light incident on a nonlinear optical crystal by utilizing the difference of the refractive index of the nonlinear optical crystal depending on the polarization direction. However, the angle matching method has a problem that a direction of the nonlinear optical crystal in which the crystal exhibits the maximum nonlinear constant cannot be used.

On the other hand, there is a method of incorporating a periodic polarization inversion structure as a method that can utilize input light that is polarized in a direction having the maximum nonlinear constant. That is, the amount of phase mismatch can be set to 0 in a quasi manner (quasi-phase matching can be achieved) by constructing a structure in which the polarization direction of a second-order nonlinear optical material is periodically inverted along the light propagation direction. Assuming that the period of a polarization inversion structure for such quasi-phase matching is $\Lambda$, the period $\Lambda$ of a polarization inversion structure for the difference frequency generation (DFG) represented by equation (3) is set to satisfy equation (4) for wavelengths $\lambda_1$, $\lambda_2$, and $\lambda_3$. $n_1/\lambda_1 - n_2/\lambda_2 - n_3/\lambda_3 - 1/\Lambda = 0$ (4) Here, the refractive index of the material changes depending on the wavelength of light, such that $n_1$ is the refractive index of the material at the wavelength $\lambda_1$, $n_2$ is the refractive index of the material at the wavelength $\lambda_2$, and $n_3$ is the refractive index of the material at the wavelength $\lambda_3$.

Conventionally, a highly efficient wavelength conversion device is realized by providing a nonlinear optical material with such a periodic polarization inversion structure and further making it an optical waveguide to confine light at high density in a narrow region and propagate it over a long distance. For example, a ridge optical waveguide having features such as high light damage resistance, long-term reliability, and ease of device design has been researched and developed because the bulk characteristics of LN crystals can be used as they are as shown in NPL 1.

For example, a first substrate on which a periodic polarization inversion structure in which a phase matching condition is partially satisfied in a predetermined wavelength band has been produced in advance and a second substrate that holds the first substrate can be directly joined together and the first substrate can be thinned and subjected to ridge processing to manufacture a wavelength conversion device with a ridge optical waveguide. A direct joining technique is known as a technique for firmly joining the two substrates to each other without using an adhesive or the like.

In NPL 1, processing using a dicing saw is performed for the confinement in the lateral direction of the waveguide, while a waveguide forming method using a dry etching method as shown in NPL 2 can also be applied in recent years.

On the other hand, an optical oscillator can also be constructed by arranging an LN crystal or an LT crystal having a periodic polarization inversion structure between mirrors to perform laser oscillation through an optical parametric oscillator using an optical parametric effect. To extract high-power laser light, the optical parametric oscillator generally uses a bulk crystal that can reduce the density of light in the polarization inversion crystal, and generally uses an LT crystal that has better heat dissipation than an LN crystal.

CITATION LIST

Non Patent Literature

NPL 1: Y. Nishida, H. Miyazawa, M. Asobe, O. Tadanaga, and H. Suzuki, "Direct-bonded QPM-LN ridge waveguide with high damage resistance at room temperature," Electronics Letters, Vol. 39, No. 7, p. 609-611, 2003.

NPL 2: T. Umeki, O. Tadanaga, and M. Asobe, "Highly Efficient Wavelength Converter Using Direct-Bonded PPZnLN Ridge Waveguide," IEEE Journal of Quantum Electronics, Vol. 46, No. 8, pp. 1206-1213, 2010.

Patent Literature

PTL 1: JP 2006-171230 A

SUMMARY OF THE INVENTION

Technical Problem

The case of wavelength conversion using such a second-order nonlinear optical effect in which $\lambda_3$ of 2.94 μm is generated with $\lambda_1$ of 0.98 μm and $\lambda_2$ of 1.47 μm according to equation (3), for example, when difference frequency generation (DFG) is caused using an LN crystal at a room temperature of 25° C. will be considered. The polarization inversion period $\Lambda$ for phase matching is 28.48 μm according to equation (4) using the relationship of the refractive index dispersions of LN at these wavelengths.

However, when $\lambda_2$ is 0.98 μm and $\lambda_3$ is 1.47 μm in equation (1), SFG light (sum-frequency light) with $\lambda_1$ of 0.588 μm is efficiently generated. That is, the polarization inversion period $\Lambda$ of the SFG becomes about 9.49 μm, which is one third the length of the DFG inversion period $\Lambda$=28.48 μm, to achieve higher-order quasi-phase matching, specifically, third-order quasi-phase matching of SFG, thus efficiently causing unintended SFG.

The reason why such high-order quasi-phase matching occurs is that the nonlinear constant can only take either a value of +d or −d and cannot take an intermediate value, such that the modulation of the nonlinear constant in the periodic polarization inversion structure forms a rectangular wave. That is, Fourier series expansion of the rectangular wave composed of two values of −1 and 1 can be expressed by the following.

$$f(x) = 4/\pi \times \{\sin(x) + \tfrac{1}{3}\times\sin(3x) + \tfrac{1}{5}\times\sin(5x) + \tfrac{1}{7}\times\sin(7x) + \ldots\} \quad (5)$$

However, there are odd-order sine components such as sin(3x) and sin(5x) in addition to sin(x), which serve as a factor to cause odd-order quasi-phase matching. That is, setting of the polarization inversion period A also causes optical conversion into unintended wavelengths (parasitic wavelengths or parasitic light) as periods such as $\Lambda/3$ and $\Lambda/5$ obtained by dividing the inversion period $\Lambda$ by the odd numbers are regarded as new polarization inversion periods.

Causing DFG has a problem that SFG occurs parasitically and the energy of excited light and signal light is transferred to a shorter wavelength by SFG, such that the energy of excited light and signal light contributing to DFG is reduced and the intensity of DFG is lowered as described above.

There is a method of inserting a phase adjustment layer in the middle as shown in PTL 1 in order to limit such unintended wavelength conversion that occurs parasitically. In this method, converted light of parasitic wavelengths is generated in an area up to the middle and is weakened in an area after the phase adjustment layer. However, because parasitic wavelength conversion occurs in an area up to the phase adjustment layer, the energy of light is taken away by the converted light of parasitic wavelengths and the intensity of source light for obtaining converted light of the originally intended wavelength is reduced. Thus, this method of the related art also has a problem that the intensity of converted light of the originally intended wavelength is lowered.

Thus, it is an object of the present invention to provide a wavelength conversion device which limits unintended wavelength conversion due to high-order quasi-phase matching and performs wavelength conversion without weakening source light within a practical range for originally intended wavelength conversion.

Means for Solving the Problem

To achieve the above object, embodiments of the present invention can employ the following configurations.

Configuration 1

A wavelength conversion device including a second-order nonlinear optical medium with a polarization inversion structure, wherein in a nonlinear optical process in which wavelength conversion is performed through an interaction in which three wavelengths of $\lambda_1$, $\lambda_2$, and $\lambda_3$ have a relationship of $1/\lambda_1 = 1/\lambda_2 + 1/\lambda_3$, the polarization inversion structure has a polarization inversion period $\Lambda$ which satisfies $n_1/\lambda_1 - n_2/\lambda_2 - n_3/\lambda_3 - 1/\Lambda = 0$ where $n_1$ is a refractive index at $\lambda_1$, $n_2$ is a refractive index at $\lambda_2$, and $n_3$ is a refractive index at $\lambda_3$ in the second-order nonlinear optical medium, the polarization inversion period $\Lambda$ is divided into 2a regions (where a is an integer of 2 or more), and when the 2a regions divided from the polarization inversion period $\Lambda$ each has a width ratio of an inverted region and a non-inverted region of r to 1−r (where 0≤r≤1), a width ratio value r is set such that, when one period in phase of a sine function from 0 to $2\pi$ is divided into 2a regions in correspondence with the division of $\Lambda$ into 2a regions, a value of the sine function in a center of each divided region is (1−2r)±0.1.

Configuration 2

The wavelength conversion device according to configuration 1, wherein the second-order nonlinear optical medium has a waveguide structure.

Configuration 3

The wavelength conversion device according to configuration 1 or 2, wherein the second-order nonlinear optical medium is $LiNbO_3$, $LiTaO_3$, or a mixed crystal thereof, and contains at least one of Mg, Zn, Sc, and In as an additive.

Effects of the Invention

According to the present invention, average polarization values in the polarization inversion structure that are seen in the light propagation direction form a shape close to that of a sine wave to limit higher-order sine wave components in the polarization inversion structure, thereby limiting generation of converted light of high-order wavelengths and limiting unintended wavelength conversion that occurs parasitically. This limits the transfer of light energy to other than the original target wavelength of the converted light, thus enabling more efficient wavelength conversion.

DESCRIPTION OF EMBODIMENTS

Figure 1:
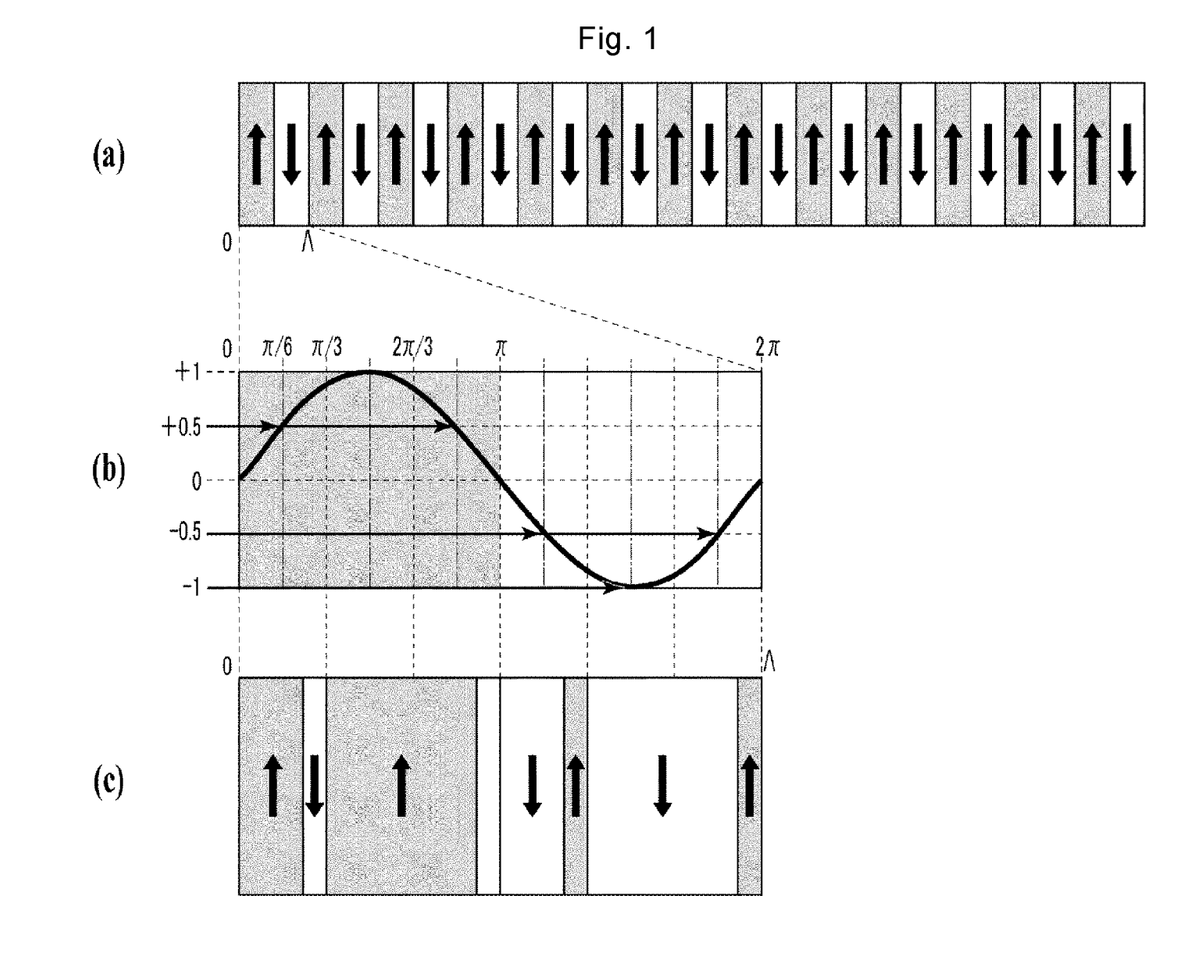
FIG. 1 is a schematic diagram illustrating a polarization inversion structure of a wavelength conversion device of the present invention.

FIG. 1 illustrates a schematic diagram for explaining a polarization inversion structure of a wavelength conversion device of the present invention. The description of FIG. 1 will be given of the case where division number a=3, that is, one period Λ of the polarization inversion structure is divided into 2a=6 regions. The division number a is an integer of 2 or more.

As illustrated in FIG. 1(a), an area up to half of one period of a conventional ordinary polarization inversion structure as seen in the light propagation direction (for example, in the rightward direction) has upward polarization (indicated by an upward arrow in each gray region of FIG. 1(a)) and the latter half of one period has downward polarization (indicated by a downward arrow in each white region of FIG. 1(a)) paired with the upward polarization, thus producing an element with a periodic structure composed of repetitions of a structure with a polarization inversion pair corresponding to a pair of upward and downward arrows as in FIG. 1(a).

FIG. 1(b) is a partially enlarged view of one period from 0 to Λ of the polarization inversion pairs of FIG. 1(a). At the same time, one period of a waveform of the trigonometric function sin (sine wave) is shown superimposed in FIG. 1(b). That is, the phase of the sine wave is represented by 0 to $2\pi$ on the horizontal axis at the upper end of FIG. 1(b). This structure of one period is divided into 6 regions (2a regions with a=3) by dotted lines, and vertical dashed-dotted lines are shown at the centers in the width direction of the 6 divided regions (where the width of each region is $\pi/3$).

The values (representative values) of the sine wave at positions indicated by the dashed-dotted lines are +0.5, +1.0, +0.5, −0.5, −1.0, and −0.5 from the left.

The representative value of each region, which is an (average) polarization value p of the region, can be considered to be represented by a ratio value r ($0 \leq r \leq 1$) of polarization inversion widths in each of the six divided regions.

The ratio of the widths of a pair of upward and downward polarizations in one region with a width of $\pi/3$ is 1−r:r, where r is the width of the downward polarization, and when the value of the upward polarization is +1 and the value of the downward polarization is −1, the average value of the polarizations of the region is (+1)×(1−r)+(−1)×r=1−2r.

That is, the average value p of polarizations in each region is in the range of $1 \leq 1-2r \geq -1$ for the width ratio value r of $0 \leq r \leq 1$ and the representative values of the trigonometric function sin can be fitted to 1−2r.

FIG. 1(c) illustrates one period (corresponding to 0 to Λ in actual size and 0 to $2\pi$ in FIG. 1(b)) of the polarization inversion structure of the wavelength conversion device of the present invention obtained by constructing polarization structures of the divided regions with such ratio values r.

A width ratio value r of the leftmost divided region in FIG. 1(c) (corresponding to 0 to $\pi/3$ in FIG. 1(b)) which satisfies p=1−2r for the representative value p=0.5 of the sine wave value is 0.25. That is, the ratio 1−r:r of the widths of the polarization inversion pair in the leftmost divided region in the bottom view, FIG. 1(c), is 0.75:0.25, that is, 3:1.

A width ratio value r of the second divided region from the left in FIG. 1(c) (corresponding to $\pi/3$ to $2\pi/3$ in FIG. 1(b)) which satisfies p=1−2r for the representative value p=1.0 of the sine wave value is 0 and the ratio of polarization inversion widths is 1:0. That is, the second divided region from the left in FIG. 1(c) is entirely composed of upward polarizations.

The width ratio values of the polarization inversions of the divided regions are calculated in the same way to provide a plurality of pairs of inversion structures in a polarization inversion structure of one period (0 to Λ in actual size), thus forming a polarization inversion structure of the wavelength conversion device of the present invention illustrated in the bottom view, FIG. 1(c). In the wavelength conversion device of the present invention, such polarization inversion structures are formed over a plurality of periods. Here, a downward region is placed on the right side of each divided region, but each downward region may be placed at any position of the region, such as on the left side or in the center of the region, as long as the positions (phases) of the downward regions in the regions are aligned.

In the wavelength conversion device of the present invention, polarization structures of such patterns to which one period of the sine wave is fitted are formed over a plurality of periods.

Figure 2:
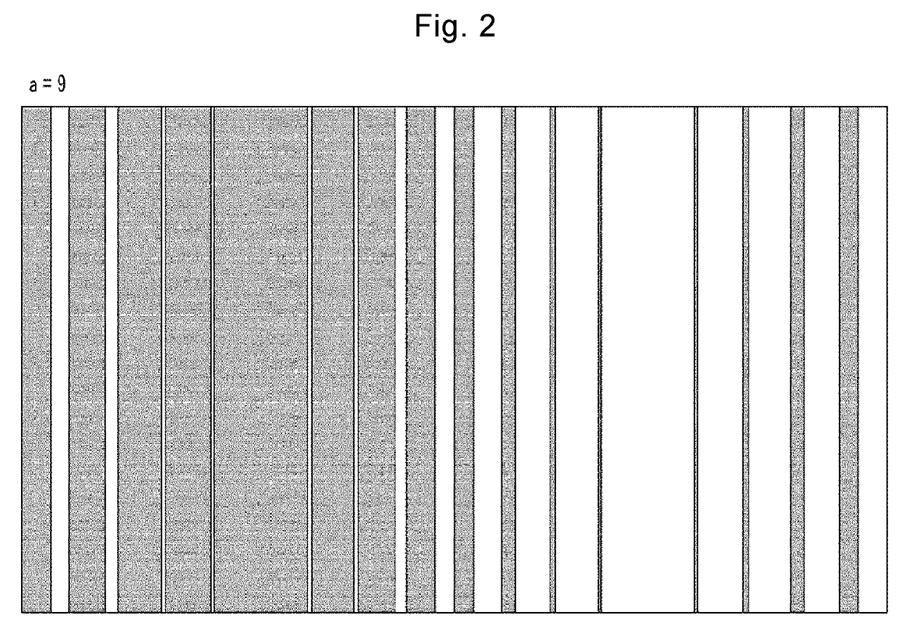
FIG. 2 is a plan view of a polarization inversion structure for one period when the division number of the wavelength conversion device of the present invention is a=9.

FIG. 2 is an enlarged plan view of a polarization inversion structure of one period of a wavelength conversion device of the present invention when division number a=9. A polarization structure, whose width ratio is adjusted such that 18 (=2a) polarization values of one period of a sine wave are generated in 18 divided regions, is formed.

Figure 3:
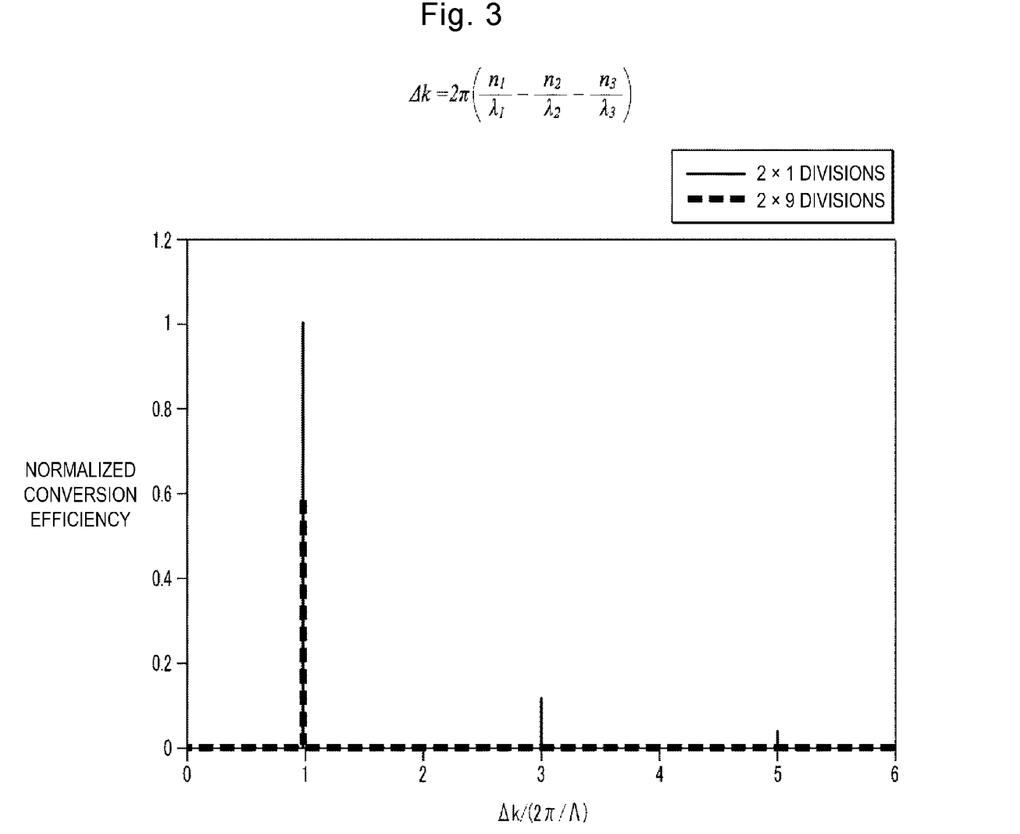
FIG. 3 is a diagram showing the normalized conversion efficiency with respect to the wavenumber of the period Λ of the polarization inversion structure in contrast to the two cases of division number a=1 and 9.

FIG. 3 is a graph with the horizontal axis representing an amount obtained by normalizing the amount of phase mismatch Δk shown at the top of FIG. 3 by $2\pi/\Lambda$ and the vertical axis representing a normalized conversion efficiency (the energy conversion efficiency of the optical conversion device) corresponding to the corresponding normalized amount of phase mismatch. The polarization inversion regions are those of 1000 periods.

The horizontal axis of FIG. 3 matches the order of quasi-phase matching, 1 on the horizontal axis corresponds to the efficiency of conversion into the original target conversion wavelength, and the other integer values correspond to the conversion efficiencies of parasitic wavelengths. The case of 2×1 divisions with division number a=1 is shown by a solid line graph and the case of 2×9 divisions with division number a=9 is shown by a dotted line graph superimposed thereon.

In the case of 2×1 divisions (of the solid line graph), the normalized conversion efficiency at the target conversion wavelength of 1 on the horizontal axis is 1, while significant parasitic light is generated at 3 and 5 on the horizontal axis. On the other hand, in the case of 2×9 divisions (of the dotted line graph), it can be seen that the normalized conversion efficiency at the target conversion wavelength of 1 on the horizontal axis drops to about 0.6, while no significant parasitic light is generated at 3 and 5 on the horizontal axis.

In consideration of these, the ordinary polarization inversion structure is considered to be that of the case of division number a=1.

Figure 4:
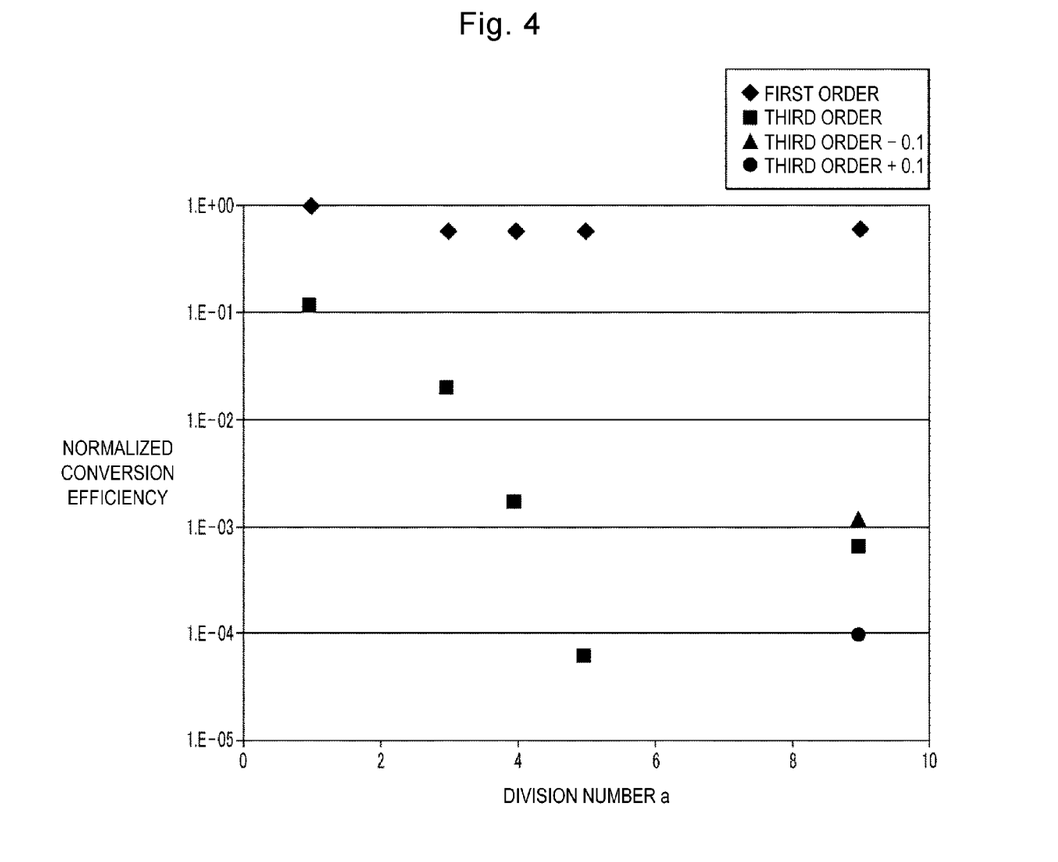
FIG. 4 is a diagram in which calculation results for first and third orders of quasi-phase matching are plotted with the division number a on the horizontal axis and the normalized conversion efficiency on the vertical axis.

FIG. 4 is a diagram in which calculation results for the first and third orders are plotted with the division number a on the horizontal axis and the normalized conversion efficiency on the vertical axis. The calculation results are those when 1 to 9 are taken as the division number a on the horizontal axis in FIG. 4 and the polarization inversion period $\Lambda$ is repeated 1000 periods. Specifically, FIG. 4 is a diagram in which normalized conversion efficiencies (♦ and ■) of the first and third orders for a=1 to 9 and calculation results for the case of a=9 with errors of −0.1 or +0 allowed for the third order (▲ and ●) are plotted as normalized conversion efficiencies on the vertical axis. (Note that the vertical axis in FIG. 4 is a logarithmic scale).

Calculations were performed for the five cases of division number a on the horizontal axis in FIG. 4, a=1, 3, 4, 5, and 9. The case of a=1 is the same as that of an ordinary polarization inversion structure as described above. It can be seen that the first-order normalized conversion efficiency (plotted with ♦) decreases to about 60% as the division number a increases as is also shown in FIG. 3, while the conversion efficiency of the third order (plotted with ■) further decreases exponentially as the division number a increases. (Note again that the vertical axis in FIG. 4 is a logarithmic scale).

When a=3 or more in FIG. 4, the third-order conversion efficiency (■) is one digit or more lower than the first-order normalized conversion efficiency (♦) and it is considered that wavelength conversion due to the third-order quasi-phase matching does not affect the decrease in energy of input light. From the viewpoint of safety, it is recommended to take a=4 or more.

Incidentally, in the case of 18 divisions with a=9, the representative values of the sine wave of the 4th and 6th divided regions are about +0.94 (that is, at division locations before and after the value of 1 of the sine wave), and those of the 13th and 15th divided regions are about −0.94, while the third-order value represented by a point ■ for a=9 in FIG. 4 rises a little as a result of calculation performed with errors allowed with the value rounded to ±0.9. The increase in efficiency at a=9 is considered to be due to the rounding error of the value.

To obtain a reference for how much error is allowed, results calculated for sine values of 0.8 and 1.0 obtained by intentionally adding errors to the sine value 0.94 in the case of a=9 are shown by points ▲ and ● for a=9 in FIG. 4 as "THIRD ORDER−0.1" and "THIRD ORDER+0.1," respectively. It can be seen that the third-order conversion efficiency is sufficiently low even if the error value changes by about ±0.1.

First Example

Figure 5:
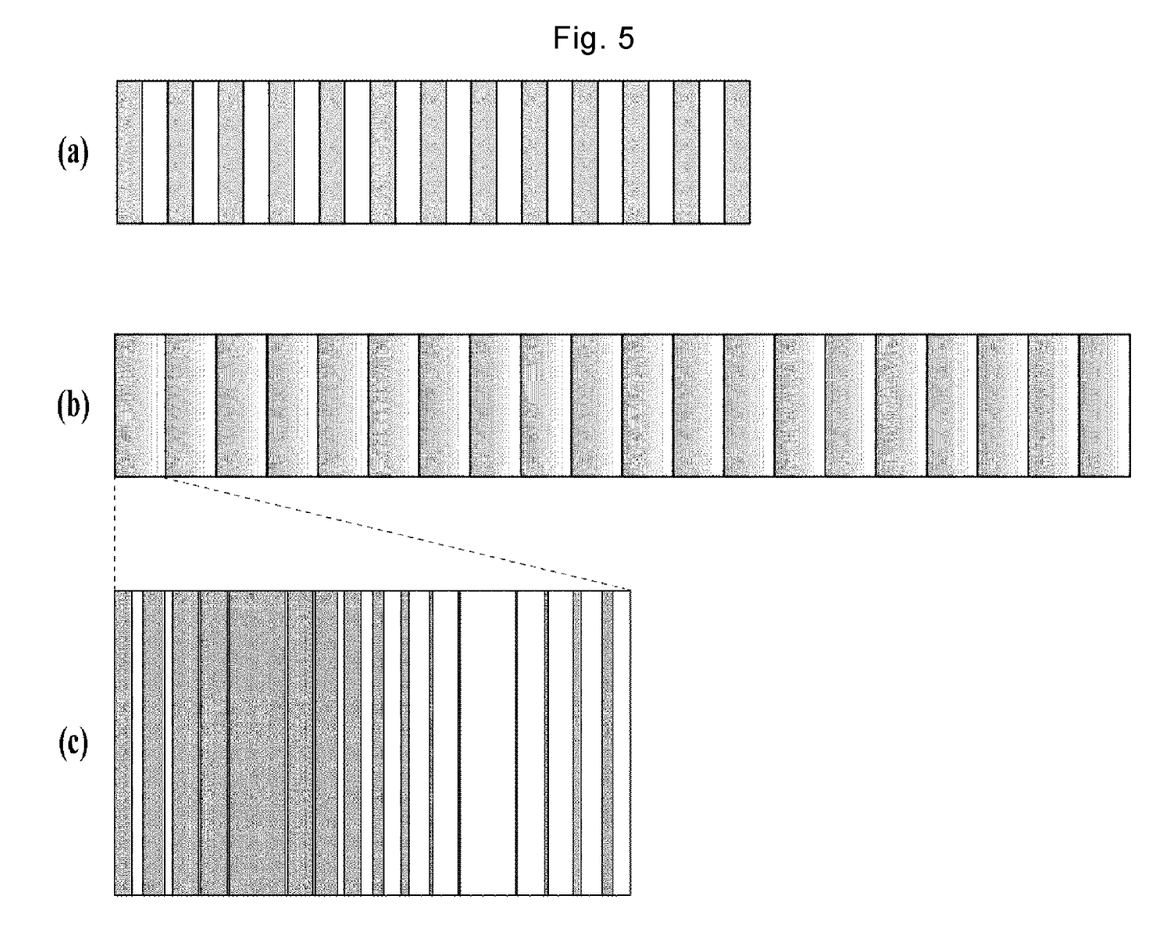
FIGS. 5(a), 5(b), and 5(c) are plan views illustrating a comparative example, the first example of the present invention, and an enlarged view of the first example, respectively.

FIG. 5 is a plan view of wavelength conversion devices formed of lithium niobate crystals having two types of polarization inversion structures prepared in connection with the first example of the present invention.

FIG. 5(a) is a plan view of a wavelength conversion device with an ordinary periodic polarization inversion structure, in which the period of a single pattern polarization inversion structure is $\Lambda$=28.48 μm, according to a conventional example as a comparative example.

FIG. 5(b) is a plan view of a wavelength conversion device with a periodic polarization inversion structure of a lithium niobate crystal having an inversion pattern, in which the period $\Lambda$=28.48 μm of the polarization inversion structure is divided into 18 regions (with division number a=9), according to the first example of the present invention. The method of the present invention involves an inversion pattern in which the polarization ratio value r of each divided region is adjusted such that the average polarization values of the divided regions become numerical values to which the sine function is fitted. FIG. 5(c) is an enlarged view of FIG. 5(b) for one period (similar to FIG. 2).

The lengths of the two elements, that is, the wavelength conversion device with the single pattern polarization inversion structure according to the comparative example of FIG. 5(a) and the wavelength conversion device with the polarization inversion structure having patterns to which the sine wave is fitted according to the first example of FIG. 5(b), were 10 mm and 12 mm, respectively.

To each element, 0.98 μm light was collimated with 200 mW and 1.47 μm light was collimated with 20 mW, each with a lens, and the collimated light beams were combined with a dichroic mirror and focused again on the center of each element with the lens, such that light of the two wavelengths was passed through each element under the same conditions.

When optical power emitted from the output side was examined, 2.94 μm light (converted light) of 3 μW was confirmed for the single pattern element of FIG. 5(a) according to the comparative example. At the same time, 0.59 μm light (parasitic light) of 5 mW was observed.

On the other hand, 2.94 μm light (converted light) of 3 μW was confirmed for the element with patterns to which a sine wave was fitted according to the first example of the present invention of in FIG. 5(b) as in the comparative example in FIG. 5(a). At the same time, the intensity of 0.59 μm light (parasitic light) was also examined, showing a reduction to a low value of 0.5 mW, which was 1/10 of that of the comparative example.

Theoretically, the conversion efficiency of the wavelength conversion device having a polarization inversion structure with patterns to which a sine wave is fitted according to the first example drops to about 60% of the conversion efficiency of the ordinary single period element of FIG. 5(a) as shown in FIGS. 3 and 4. However, the length of the wavelength conversion device of FIG. 5(b) is 12 mm, which is 1.2 times that of the element of the comparative example of FIG. 5(a), and thus the conversion efficiency is 1.44 times, the square of 1.2 times. That is, the efficiency of the wavelength conversion device of the first example in FIG. 5(b) which imitates a sine wave is 0.9 times (≈0.6×1.44) that of the conventional example having a single pattern period and it is still expected that the output of the converted light is slightly smaller.

Moreover, because the source light is focused by a lens, it is expected that as the length increases, the density of light will decrease at both ends and the efficiency will decrease. However, it is considered that the reason why the first example of FIG. 5(b) here has acquired mid-infrared converted light similar in intensity to that of the comparative example of FIG. 5(a) is that it can limit a reduction in optical power of input light due to generation of parasitic light of 0.59 µm and can perform wavelength conversion without weakening the source light within a practical range.

Although an example of wavelength conversion using a bulk crystal of lithium niobate was shown in the first example above, the second-order nonlinear optical crystal material is not limited to lithium niobate ($LiNbO_3$) and may be lithium tantalate ($LiTaO_3$), a mixed crystal thereof, or other second-order nonlinear optical crystal materials. A small amount of additive selected from Mg, Zn, Sc, and In may also be added. In addition, although DFG generation of bulk crystals was shown in the first example, the same effects can be achieved using a waveguide type element.

INDUSTRIAL APPLICABILITY

As described above, the present invention can provide a wavelength device element which can limit unintended wavelength conversion due to high-order quasi-phase matching and performs wavelength conversion without weakening source light within a practical range for originally intended wavelength conversion.

The invention claimed is:

1. A wavelength conversion device comprising a second-order nonlinear optical medium with a polarization inversion structure, wherein in a nonlinear optical process in which wavelength conversion is performed through an interaction in which three wavelengths of $\lambda_1$, $\lambda_2$, and $\lambda_3$ have a relationship of $1/\lambda_1=1/\lambda_2+1/\lambda_3$, the polarization inversion structure has a polarization inversion period $\Lambda$ which satisfies $n_1/\lambda_1-n_2/\lambda_2-n_3/\lambda_3-1/\Lambda=0$ where $n_1$ is a refractive index at $\lambda_1$, $n_2$ is a refractive index at $\lambda_2$, and $n_3$ is a refractive index at $\lambda_3$ in the second-order nonlinear optical medium, the polarization inversion period $\Lambda$ is divided into 2a regions (where a is an integer of 2 or more), and when the 2a regions divided from the polarization inversion period $\Lambda$ each has a width ratio of an inverted region and a non-inverted region of r to 1−r (where $0 \le r \le 1$), a width ratio value r is set such that, when one period in phase of a sine function from 0 to $2\pi$ is divided into 2a regions in correspondence with the division of $\Lambda$ into 2a regions, a value of the sine function in a center of each divided region is $(1-2r) \pm 0.1$.

2. The wavelength conversion device according to claim 1, wherein the second-order nonlinear optical medium has a waveguide structure.

3. The wavelength conversion device according to claim 2, wherein the second-order nonlinear optical medium is $LiNbO_3$, $LiTaO_3$, or a mixed crystal thereof, and contains at least one of Mg, Zn, Sc, and In as an additive.

4. The wavelength conversion device according to claim 1, wherein the second-order nonlinear optical medium is $LiNbO_3$, $LiTaO_3$, or a mixed crystal thereof, and contains at least one of Mg, Zn, Sc, and In as an additive.

* * * * *